US010372435B2

(12) United States Patent
Assuncao et al.

(10) Patent No.: US 10,372,435 B2
(45) Date of Patent: Aug. 6, 2019

(54) SYSTEM, METHOD AND PROGRAM PRODUCT FOR UPDATING VIRTUAL MACHINE IMAGES

(71) Applicant: International Business Machines Corporation, Armonk, NY (US)

(72) Inventors: Marcos Dias De Assuncao, Sao Paulo (BR); Marco Aurelio Stelmar Netto, Sao Paulo (BR); Lakshminarayanan Renganarayana, Elmsford, NY (US); Christopher C. Young, Sleepy Hollow, NY (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 15/396,889

(22) Filed: Jan. 3, 2017

(65) Prior Publication Data
US 2017/0109157 A1    Apr. 20, 2017

Related U.S. Application Data (63) Continuation of application No. 14/031,091, filed on Sep. 19, 2013, now Pat. No. 9,600,262.

(51) Int. Cl.
*G06F 8/65* (2018.01)
*G06F 8/658* (2018.01)
(Continued)

(52) U.S. Cl.
CPC ................ *G06F 8/65* (2013.01); *G06F 8/658* (2018.02); *G06F 8/70* (2013.01); *G06F 8/71* (2013.01);
(Continued)

(58) Field of Classification Search
None
See application file for complete search history.

(56) References Cited

U.S. PATENT DOCUMENTS

| 6,477,703 | B1 | 11/2002 | Smith et al. |
| 7,840,957 | B2 | 11/2010 | Kumashiro et al. |
| (Continued) | | | |

FOREIGN PATENT DOCUMENTS

WO    2007136448    11/2007

OTHER PUBLICATIONS

Hori et al., "Proposal and Evaluation of Data Reduction Method for Tracing Based Pre-patch Impact Analysis" C.S. Hong et al. (Eds.): APNOMS 2009, LNCS 5787, pp. 41-50, 2009.
(Continued)

*Primary Examiner* — Francisco J Aponte
*Assistant Examiner* — Mark A Gooray
(74) *Attorney, Agent, or Firm* — Law Office of Charles W. Peterson, Jr.; Louis J. Percello, Esq.; Grant A. Johnson, Esq.

(57) ABSTRACT

A system, method and computer program product for allocating shared resources. Upon receiving requests for resources, the system determines whether there are any pending updates for a VM image for provisioning a virtual machine (VM) for the request. For each image with pending updates the system determines whether to replace the stored image with an updated VM image and provision from the replacement or, update a single instance of the image and provision from the single instance. The system also determines an optimal time to update images with pending updates. After replacing an image, the system provides an alert indicating that an updated said VM was provisioned.

24 Claims, 6 Drawing Sheets

(51) Int. Cl.
  *G06F 8/70* (2018.01)
  *G06F 8/71* (2018.01)
  *G06F 9/455* (2018.01)
  *G06F 9/50* (2006.01)
  *H04L 29/08* (2006.01)

(52) U.S. Cl.
  CPC ...... *G06F 9/45533* (2013.01); *G06F 9/45537* (2013.01); *G06F 9/45558* (2013.01); *G06F 9/5055* (2013.01); *H04L 67/1036* (2013.01); *H04L 67/34* (2013.01); *G06F 2009/4557* (2013.01); *G06F 2009/45562* (2013.01); *G06F 2009/45595* (2013.01)

(56) References Cited

U.S. PATENT DOCUMENTS

| | | | |
|---|---|---|---|
| 7,975,264 B2 | 5/2011 | Sriram et al. | |
| 8,176,483 B2 | 5/2012 | Hoefler et al. | |
| 9,280,374 B2 * | 3/2016 | McNeill | G06F 9/45533 |
| 2002/0184619 A1 * | 12/2002 | Meyerson | G06F 8/65 717/173 |
| 2006/0080656 A1 | 4/2006 | Cain et al. | |
| 2007/0169089 A1 * | 7/2007 | Bantz | G06F 9/4484 717/168 |
| 2007/0192763 A1 | 8/2007 | Helvick | |
| 2008/0201702 A1 | 8/2008 | Bunn | |
| 2009/0222811 A1 | 9/2009 | Faus et al. | |
| 2010/0257517 A1 | 10/2010 | Sriram et al. | |
| 2010/0287544 A1 | 11/2010 | Bradfield et al. | |
| 2011/0197051 A1 | 8/2011 | Mullin et al. | |
| 2012/0011035 A1 | 1/2012 | Calcaterra et al. | |
| 2012/0084445 A1 | 4/2012 | Brock et al. | |
| 2013/0060924 A1 | 3/2013 | Zhang et al. | |
| 2013/0074072 A1 * | 3/2013 | Kennedy | G06F 9/44505 718/1 |
| 2013/0297921 A1 | 11/2013 | Wright et al. | |

OTHER PUBLICATIONS

H. Cavusoglu, et al., Economics of security patch management, 5th Workshop on the Economics of Information Security (WEIS 2006), Jun. 2006.

Jerry Rolia, et al., Statistical Service Assurances for Applications in Utility Grid Environments, Performance Evaluation, vol. 58, No. 2+3, pp. 319-339, 2004.

Xia, Binzhou et al., Tighter bounds of the First Fit algorithm for the bin-packing problem, "Tighter bounds of the First Fit algorithm for the bin-packing problem", Discrete Applied Mathematics 158 (15): 1668-1675 (2010).

Bansal et al. Improved approximation algorithms for multidimensional bin packing problems. Proceedings of the 47th Annual IEEE Symposium on Foundations of Computer Science, 2006. FOCS '06.

Poothokaran et al. A study on evaluation of algorithms for multi-objective Bin Packing Problems. Proceedings. of the International Conference on Computers and Industrial Engineering (CIE), 2010.

* cited by examiner

```
1660    INPUT:     image
1662               patchingDeadline
1664               futureVMs
1666               patchingTimeSlotSize 1668    OUTPUT:    patchTimeSlots 1670               bins <- createBins(patchingDeadline, patchingTimeSlotSize)
1672               execute a bin packing heuristic where
1674                   bin capacity <- patchingTimeSlotSize
1676                   an object <- number of future VMs
1678               return bins
```

Fig. 7

SYSTEM, METHOD AND PROGRAM PRODUCT FOR UPDATING VIRTUAL MACHINE IMAGES

CROSS REFERENCE TO RELATED APPLICATION

The present application is a continuation of U.S. patent application Ser. No. 14/031,091, "SYSTEM, METHOD AND PROGRAM PRODUCT FOR UPDATING VIRTUAL MACHINE IMAGES" to Marcos Dias De Assuncao et al., filed Sep. 19, 2013, assigned to the assignees of the present invention and incorporated herein by reference.

BACKGROUND OF THE INVENTION

Field of the Invention

The present invention is related to allocating up to date shared resources and more particularly to selecting an optimal time for applying pending patches and updates to virtual machine images for satisfying resource requests and instantiating virtual machines with minimal delay and disruption.

Background Description

Acquiring, managing and maintaining Information Technology (IT) is a major budgetary concern for any modern organization. Moreover, since organizations seldom use local physical hardware (e.g., mainframe servers) at full capacity, frequently, some capacity is wasted. To reduce IT infrastructure costs and waste, instead of acquiring physical hardware, organizations are increasingly consolidating workload on shared hardware, using virtual machines (VMs) hosted on provider servers or computers. Ideally, each VM appears as an independent computer (e.g., a virtual processor, memory and disk space) running, for example, an operating system (OS) and a software stack with one or more active software elements (e.g., applications or other software).

As with any stand-alone computer, setting up a VM from scratch takes some measurable time. For example, provisioning a VM from scratch may involve allocating shared hardware for the VM and then, opening the OS and installing the software stack on the VM. So for efficiency, rather than repeatedly setting up VMs from scratch, providers are capturing the state of allocated virtual hardware and configured software in a file representation or virtual machine.

A minimum VM image is a file representation of a configured virtual machine and/or the virtual machine device(s). A VM image may further include all installed software components, i.e., the OS and software stack. Normally, each image is packaged with metadata describing corresponding hardware and software requirements in a virtual resource template (VRT or template). Each template includes at least one, and can include more than one, image. Since the number of potential VM images is unlimited, the provider selects a set of VM images and stores the images in a library of such images, for more efficiently provisioning virtual machines. Thereafter a virtualizer server loads VM image library image(s) to instantiate and run the respective virtual machine(s), and customizes the loaded image(s) for specific request requirements.

As with any state of the art computer system, virtual machines require updates or patches, e.g., to fix bugs, patch security weaknesses or patch software features. Updating or patching a virtual machine requires updating or patching the VM image, either to the VM image in the image library or individually patching the image each time it is instantiated. Patching the image individually, as a VM is being provisioned, limits potential wide ranging complications from the patch, but requires repeatedly patching/updating with no guarantee that of a successful patch for every instance, e.g., occasionally the patch may break the configuration. However, it may be relatively simple to recover from the broken configuration by re-provisioning the same VM without the patch. While patching an image library VM image may eliminate the patching and re-patching each VM, it affects every subsequently provisioned VM. Consequently deciding whether, when and how to patch the image library image is much more complex and risky.

Thus, there is a need for minimizing the time and resources required to patch VM images and VM instances, as well, and more particularly, there is a need for determining an optimum time for applying outstanding software patches or image updates without inadvertently applying updates that break existing image applications, damage software dependencies, or otherwise render customer applications completely unusable on the updated image.

SUMMARY OF THE INVENTION

A feature of the invention is reduced resource consumption and risk in provisioning virtual machines from up to date virtual machine (VM) images;

Another feature of the invention is selection of an optimal time to apply patches/update VM images;

Yet another feature of the invention resource consumption in repeatedly patching images prior to VM instantiation, while reducing risk in provisioning VMs from updated VM images, and minimizing the time required to recover from a VM that no longer functions because of an update.

The present invention relates to a system, method and computer program product for allocating shared resources. Upon receiving requests for resources, the system determines whether there are any pending updates for a VM image for provisioning a virtual machine (VM) for the request. For each image with pending updates the system determines whether to replace the stored image with an updated VM image and provision from the replacement or, update a single instance of the image and provision from the single instance. The system also determines an optimal time to update images with pending updates. After replacing an image, the system provides an alert indicating that an updated said VM was provisioned

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service. Moreover, the present invention provides for client self-monitoring for adjusting individual resource allocation and configuration on-the-fly for optimized resource allocation in real time and with operating costs and energy use minimized.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources, sometimes referred to as a hypervisor, where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
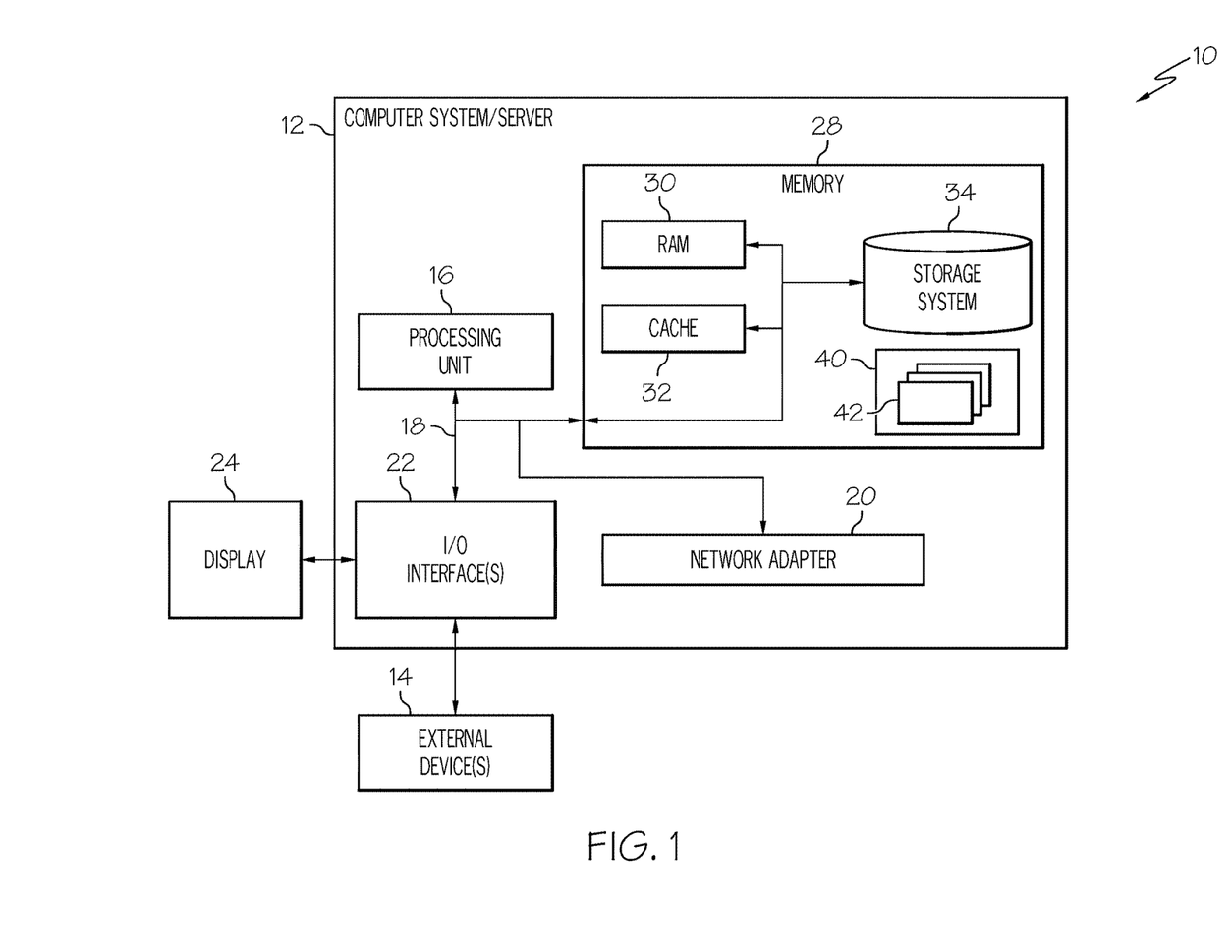
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
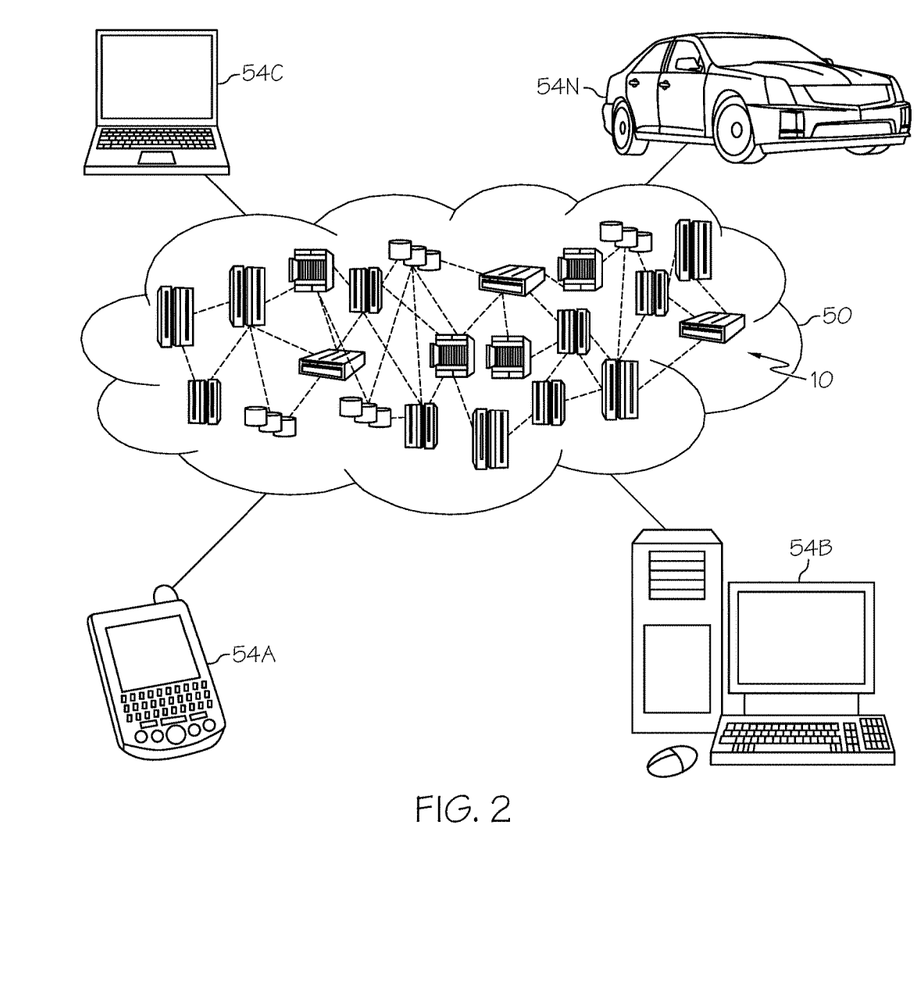
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
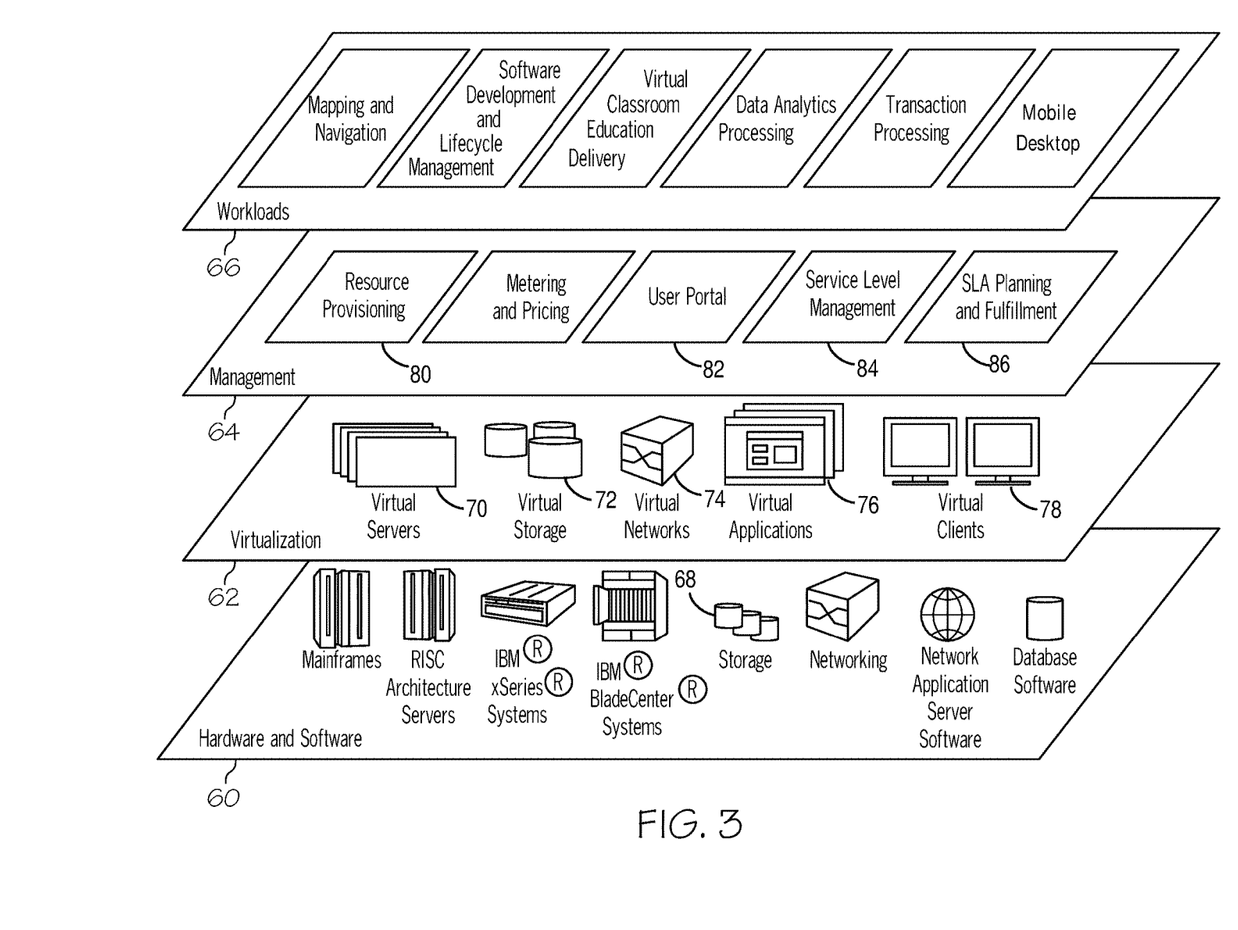
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted in this example, a hardware and software layer 60, a virtualization layer 62, a management layer 64, workloads layer 66 and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices 68; networks and networking components. Examples of software components include network application server software, in one example IBM Web Sphere® application server software; and database software, in one example IBM DB2® database software. (IBM, zSeries, p Series, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers 70; virtual storage 72; virtual networks 74, including virtual private networks; virtual applications and operating systems 76; and virtual clients 78.

In one example, management layer 64 may provide the functions described below. Resource provisioning 80 provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 82 provides access to the cloud computing environment for consumers and system administrators. Service level management 84 provides cloud computing resource allocation and management such that required service levels are met. Service Level Agreement (SLA) planning and fulfillment 86 provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Mobile Desktop.

Figure 4:
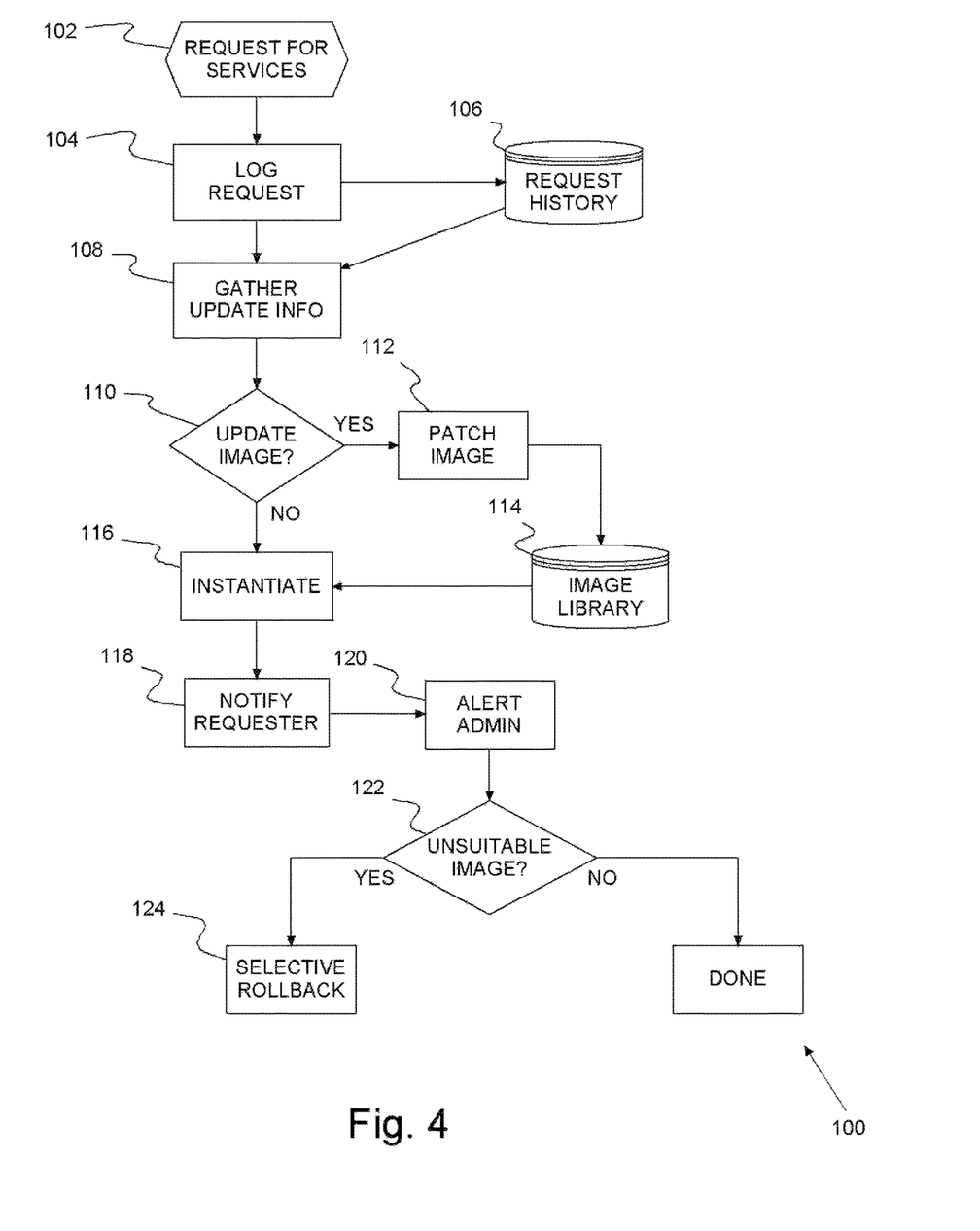
FIG. 4 shows an example of preferred system updating/patching virtual machine (VM) images for instantiation in virtualization layer providing a virtualized environment according to a preferred embodiment of the present invention.

FIG. 4 shows an example of a preferred system (e.g., 20 of FIG. 2) updating/patching 100 virtual machine (VM) images for instantiation in virtualization layer 62 for providing a virtualized environment according to a preferred embodiment of the present invention. Preferably, the system includes one or more computers (e.g., 10 in FIGS. 1 and 2) providing a VM provisioning (e.g., 80 in FIG. 3) system, an image library and a request history, e.g., both in provider storage 68, and an image update system, e.g., as SLA planning and fulfillment 86.

As noted hereinabove, just as with any state of the art computer system, VM images require updates or patches, e.g., to fix bugs, patch security weaknesses or patch software features. Applying these patches to update a VM image is much more complex and requires much more effort than individually patching virtual machines as they are instantiated. This is because patching the VM image has wider ranging effects, affecting every subsequently provisioned VM. Patching the image risks breaking existing configurations, the provisioning flow, and/or possible management agent stacks as well. Not patching the image, however, requires patching that unpatched image at every VM instantiation. Depending on the extent of the patch/update, repeatedly patching can also be time consuming, costly and result in unnecessary, wasted resource consumption. Since some instances may still remain untested, updating an image library image risks breaking existing individual configurations.

By contrast a preferred VM allocation system, e.g., to service level management 84, determines an optimum time for updating images and individually patches images prior to instantiation until arriving at that optimum update time. The preferred VM provisioning system fetches images from the image library in storage 68 and creates virtual machines 62. The preferred image library is a repository for VM images in storage 68 used to create virtual machines. The VM allocation system logs past VM requests in request history, also in storage 68, storing historical information about past virtual machine requests, e.g., image use frequency. The preferred image update system receives incoming software patches and updates, analyses whether stored images need to be updated and alerts system administrators through user portal 82 on when to update images and/or instances.

A request 102 for resources to resource provisioning 80 passes to a VM allocation system, e.g., a typical computer 10 as in FIGS. 1 and 2. The VM allocation system logs 104 request information 106 for further use. An image update system gathers 108 software patch and update information about pending patches and/or updates. Then, the image update system determines 110 whether a pending patch or update(s) is(are) designated for requested resources from logged request information 106. If so, the image update system determines whether to update 112 the image in image library 114 or patch a single instance of the image for responding to the request 102, based on gathered data and history 106 of logged past VM requests. When the image update system updates the image, the system stores the updated image in the image library 114, replacing the old image.

Otherwise, if the image update system determines 110 no update is required, or after patching 112 a single instance or updating the image, the VM allocation system provisions 116 the VM with the current image and makes the provisioned virtual machine available, notifying 118 the requesting user. Finally, the image update system alerts 120 system administrators, providing information indicating the best time to update images. Thus, the present invention advises administrators where and when to apply updates. Depending on update difficulty and availability of resources and systems for updating, either the administrator may install the update or allow a system update to an image or images.

If the update(s) made an existing image unsuitable for some clients 122, e.g., the configuration no longer works because of the update, the alerted 120 system administrator(s) can recover 124 quickly. For example, an administrator can initiate a rollback, reversing/uninstalling the update on a case by case basis, to minimize the time to recover. Alternately, the administrator can leave the rollback to system control.

Figure 5A:
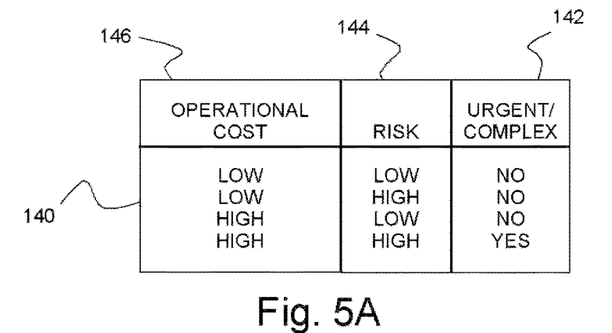
FIGS. 5A-B show an example of a Complexity Determination Table used by a preferred image update system to determine an optimum time to patch/update images.
Figure 5B:
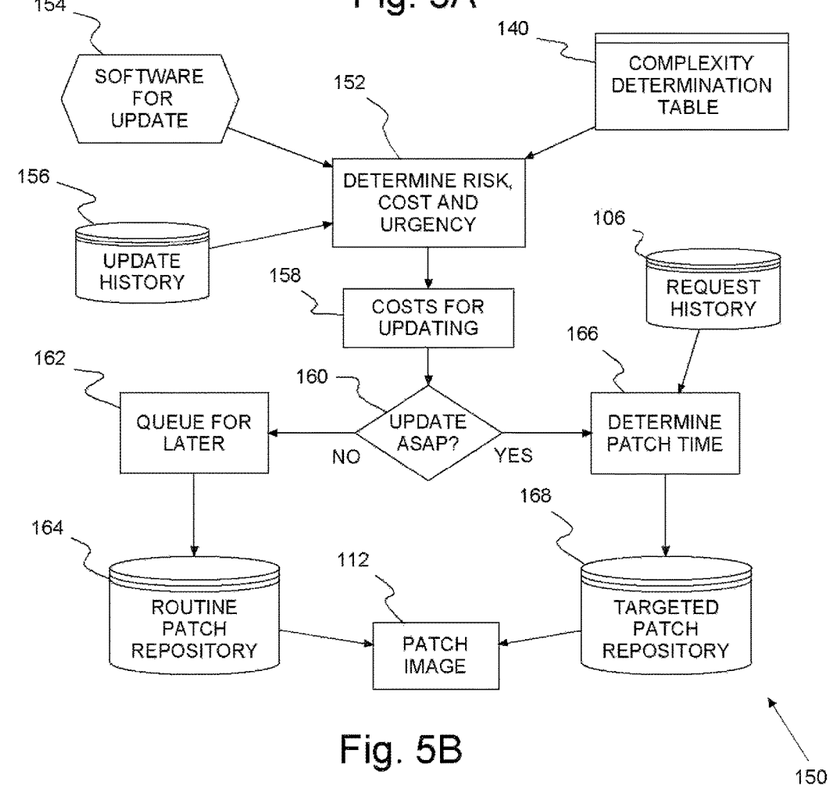

FIGS. 5A-B show an example of a Complexity Determination Table 140 used by a preferred image update system to determine 150 an optimum time to patch/update images 112. The Complexity Determination Table 140 provides a decision matrix with parametric entries for urgency/complexity 142, risk 144, and operational cost 146. Urgency/complexity 142 may be categorized as urgent/complex or non-urgent and include, for example, the importance of a software update in maintaining a system free from security vulnerabilities. Risk 144 may be categorized as high or low and reflect the potential for an updated image being unsuitable for existing applications and/or configurations. Urgency/complexity 142 and risk 144 may be quantified from previous updating experience or shared experience from other sources, e.g., published on the Internet. Operational cost 146 can be categorized as high or low and include, for example, patch downloading costs, cost in applying the patch to an image, testing costs or testing the updated image and applications. It is understood that although shown in the example of FIG. 5A as binary variables, any suitable metric may be used to quantify urgency/complexity 142, risk 144, and operational cost 146.

The image update system first determines 152 risk, cost and urgency for an incoming software patch 154 from patch history information 156 (e.g., from a patch history repository maintained by an incident management system), guided by the Complexity Determination Table 140 decision matrix. From the risk, cost and urgency of patching/updating, the image update system determines 158 an operational cost and a cost for patching. If update costs indicate the update is not urgent and not complex 160, the image update system queues 162 the update in a routine patch repository 164 for subsequent, routine application to the respective image, e.g., as part of a larger more encompassing library update. Otherwise, if update is urgent or costs indicate the update complex 160 (e.g., cost is above a selected threshold), the image update system determines 166 a targeted update time to patch the respective image for optimal results and queues 168 the patch/update, e.g., in a targeted patch repository. Whether the image update system queues the patch for routine application 162, or for more targeted, urgent handling 166, the image update system always applies updates 112 before instantiating a respective VM from the old image.

The image update system determines 150 for each incoming update the costs/disadvantages 158 associated with updating from collected patch information and history data 156 from incident management, e.g., a manned or automated help desk. The complexity determination table 140 establishes update complexity. If image update system determines 160 an update is neither complex nor urgent, the update is added 162 to a list 164 of outstanding patches for later application, e.g., in a batch or as part of a larger update. Otherwise, the update system includes 166 the patch in a repository 168 of complex and urgent patches. Preferably, all patches in the repository have the same urgency (priority) as all other urgent patches. It is understood, however, that the update system may assign different priorities for different degrees of urgency. Substantially coincidentally, the update system evaluates 166 application and prior request frequency 106 to determine an optimum time for applying 160 the patch or update. Preferably, the update system selects an update time as optimum to minimize recovery time, i.e., the length of time to recover from potential failures caused by the new patch.

Figure 6:
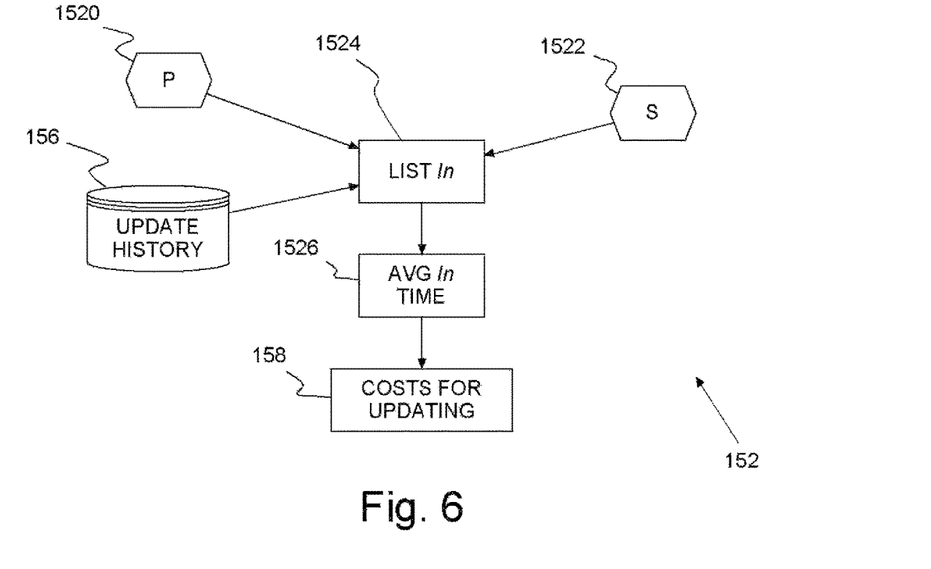
FIG. 6 shows an example of determining operational cost for a patch.

FIG. 6 shows an example of determining 152 operational cost 158 for a patch, p, 1520. Determining 152 operational cost 158 begins with identifying 1522 any software, s, to be patched from the patch history 156. Any image in the image library (e.g., 114 in FIG. 4) with s may need an eventual update. The patch history chronicles incidents associated with all previous software changes/applied patches within a given granularity, e.g., hourly, every 6 hours, daily, weekly, or monthly. The image update system collects and lists 1524 past incidents, In, associated with previously patching/updating s in an incident list. Then, the image update system averages the incident resolution time 1526 for In to determine operational and recovery cost 158 for p.

Figure 7:
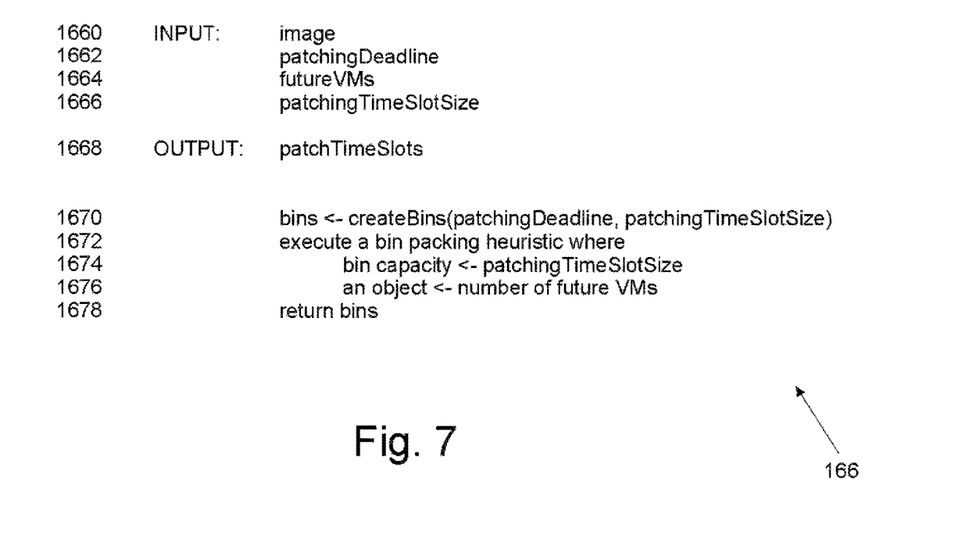
FIG. 7 shows an example of pseudo code for determining an optimum update time for updating an image (image).

FIG. 7 shows an example of pseudo code for determining 166 an optimum update time for updating an image (image) 1660 with reference to FIG. 5A. The image update system has a previously defined default maximum (patchingDeadline) 1662 or upper limit for updating or applying patches, e.g., 30 days. For each image there is a forecast (futureVMs) 1664 of VMs expected for each time period within patchingDeadline. Preferably, the image update system maintains a moving or running average for each image of the number of past requests for each VM image over a selected number of most recent time periods (patchingTimeSlotSize) 1666, e.g., hourly for the most recent 24 hours or every half day for the most recent 12 days. The image update system uses that running average for predicting from futureVMs, the likely number VMs that may be created in each subsequent time period (patchTimeSlots) 1668, as a list of bins with patches and the specific time slot to apply each. For example, patchTimeSlots 1668 may list 100 VMs on day 1, 200 VMs on day 2, and 500 VMs on day 3.

The image update system first segments 1670 the time for updating, patchingDeadline, into time segments or bins, each patchingTimeSlotSize long. After initializing bins 1670, the image update system applies a heuristic 1672 to assign updates, e.g., a bin packing heuristic. The heuristic 1672 designates which patches to apply in each bin to minimize total recovery time and operational costs, where bin capacity 1674 is determined by patchingTimeSlotSize. Preferably, the heuristic determines 1676 a number of future VMs to be created for each bin for the patchingTimeSlotSize as a function of the operational cost of each given patch. The final result is the list of bins 1678, e.g., [day 1: patch1, patch5], [day 2: patch2, patch4], and [day 6: patch7, patch8].

Alternately, instead of using a heuristic, the image update system may use a suitable probability mass distribution to predict the number of VMs for each bin. In another alternate heuristic based embodiment the image update system generates empty bins, applies all patches to each bin, and returns the bin with the lowest value (i.e., the lowest operational cost). In this alternate embodiment, the image update system applies all patches in the same identified time slot or bin. Suitable such heuristics for bin packing include well known first-fit and best-fit heuristics. Thus, when the update(s) is complex or urgent, the image update system applies a set of updates to respective images with the recovery time for each minimized.

Advantageously, application of the present invention avoids traditional operational costs associated with identifying, testing and installing patches and updates. Patching does not require that the system being patched be fully live and running prior to applying the patch. The present invention minimizes required time and resources for patching images and/or instances. Moreover, a preferred system determines whether outstanding patches should be applied to an image, or postponed and individually patching image instances as they are created. Thus, the present invention minimizes previously encountered problems from updates making existing applications and images non-functional, damaged software dependencies and customer applications rendered completely unusable. Because a preferred system applies patches to minimize failure recovery time, if a problem does arise from a badly patched image, for example, restoring a previous version of the old image and re-provisioning the broken VM(s) is done at relatively little cost.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of sharing system resources comprising:
   receiving a request for resources provisioned from a virtual machine (VM) image library with a plurality of VM images;
   determining whether provisioning for said request is from a VM image with any pending updates, and if no update for said VM image is pending, provisioning said VM and returning to receiving requests;

otherwise determining whether to update said VM image in said VM image library or to provide a single patched image instance, based on gathered data and history of logged past VM requests;

if determined to update said VM image in said VM image library, perform said pending updates on the VM image in the library and save the image replacing the old image in the library and provisioning said updated VM image to respond to the request;

otherwise perform said pending updates on an single instance of said VM image and provisioning said updated VM image to respond to the request; and providing an alert indicating that an updated said VM image was provisioned, and whenever a single patched image instance is provided, queuing said patched image for subsequently updating said VM image in said VM image library responsive to the urgency and complexity of updating said VM image; and returning to receiving requests.

2. A method as in claim 1, wherein determining whether to update determines said urgency and complexity of updating said VM image, updates being typed as routine or targeted.

3. A method as in claim 2, wherein routine updates are queued for updating a respective image as a regularly scheduled update and targeted updates are queued and scheduled for an optimal update.

4. A method as in claim 2, wherein determining said urgency and complexity of updating comprises:
   determining risk, cost and urgency of said update;
   determining operational cost and a cost of applying said update; and
   determining whether said operational cost and a cost of applying indicates said update is complex, updates identified as urgent or complex being identified as targeted updates.

5. A method as in claim 4, wherein determining operational cost and cost of applying comprises:
   identifying any image software (s) to be patched (p) from the patch history;
   generating a list of past incidents (In) associated with previously patching/updating software (s); and
   averaging listed said past incidents (In).

6. A method as in claim 5, wherein targeted updates are queued for updating at an optimal update time, determining the time for optimal updates for queued, targeted updates comprising:
   segmenting a maximum time to patch (patchingDeadline) into a plurality of time patch bins, each time patch bin being no longer than a selected patching period (patchingTimeSlotSize);
   heuristically packing said plurality of time patch bins with updates; and
   providing a list of packed bins, said list indicating image updates to be applied in a specific time segment within patchingDeadline.

7. A method as in claim 6, further comprising maintaining a moving average for each image of the number of requests for each VM image over a selected number of most recent patchingTimeSlotSize.

8. A method as in claim 1, wherein said method shares cloud resources in a cloud environment and whenever provisioning said VM for said request is determined to provisions from a VM image without any pending updates, after provisioning said VM, said method further comprises returning to receiving requests without providing an alert.

9. A shared resource system comprising:
   one or more provider computers, a plurality of client devices selectively requesting resources from said one or more provider computers;
   a virtual machine (VM) image library with a plurality of VM images with bundled software, one or more of said images having at least one outstanding update, each said outstanding update updating a part of a respective said VM image;
   a VM provisioning system provisioning VMs on said one or more provider computers responsive to received client requests; and
   an image update system passing updated images to said VM provisioning system and applying updates to respective ones of said images in said VM image library on a routine basis,
      said image update system determining whether said request is for a VM image with any outstanding updates when a request is received, and when one or more updates are outstanding said image update system
      selectively based on gathered data and history of logged past VM requests, updating images in said VM image library or
      updating single instances of individual VM images, passing said single instances to said VM provisioning system for provisioning respective VMs and queuing said single instances for subsequently updating said individual VM images in said VM image library, said VM provisioning system otherwise
      provisioning VMs from VM images in said VM image library.

10. A shared resource system as in claim 9, further comprising:
    an incident management system; and
    an incident store storing information on past software patch and image update incidents from said incident management system.

11. A shared resource system as in claim 10, responsive to each received client request said image update system collecting information from said incident store about updates previously applied to each said respective VM image, said image update system determining update costs of applying each said update to said each respective individual VM image, said image update system identifying pending updates as routine or targeted, targeted updates being urgent updates or having said update costs determined above a selected threshold, routine updates being updated on said routine basis.

12. A shared resource system as in claim 11, further comprising:
    a targeted update repository, said image update system queuing in said targeted update repository targeted image updates with an update time targeted to update said each respective VM image for optimal results; and
    a routine update repository, said image update system queuing routine image updates in said routine update repository on said routine basis.

13. A shared resource system as in claim 11, wherein update costs include operational cost and cost of applying a respective update, said system further comprising a request History storage logging prior requests for each VM image in said image library, said image update system predicting VM image request frequency responsive to logged prior requests.

14. A shared resource system as in claim 13, wherein said image update system comprises:
- means for listing incidents (In) on past software (s) patches (p);
- means for averaging listed incidents to determine said update costs;
- means for segmenting a maximum time to patch (patchingDeadline) into a plurality of time patch bins, each time patch bin being no longer than a selected patching period (patchingTimeSlotSize);
- means for heuristically packing said plurality of time patch bins with updates responsive to predicted said VM image request frequency; and
- means for providing a list of packed bins, each packed bin indicating image updates to be applied in a specific time segment within patchingDeadline.

15. A shared resource system as in claim 12, wherein said one or more provider computers are cloud computers in a cloud environment, said shared resources are cloud resources in said cloud environment, said one or more cloud computers including said VM provisioning system, said incident management system and said image update system.

16. A computer program product for allocating shared system resources, said computer program product comprising a non-transitory computer usable medium having computer readable program code stored thereon, said computer readable program code causing one or more computer executing said code to:
- receive requests for resources, said request being provisioned from a virtual machine (VM) image library with a plurality of VM images;
- determine whether provisioning for said request is provisioned from a VM image with any pending updates, and if no update for said VM image is pending said VM is provisioned, and return to receiving requests;
- otherwise determine whether to update said VM image in said VM image library or to provide a single patched image instance, based on gathered data and history of logged past VM requests;
- if determined to update said VM image in said VM image library, perform said pending updates on the VM image in the library and save the image replacing the old image in the library and provision said updated VM image to respond to the request;
- otherwise perform said pending updates on a single instance of said VM image and provisioning said update VM image to respond to the request; and
- provide an alert indicating that an updated said VM was provisioned; and
- whenever a single patched image instance is provided, said patched image is queued for subsequently updating said VM image in said VM image library responsive to the urgency and complexity of updating said VM image, and
- return to receiving requests.

17. A computer program product for allocating shared system resources as in claim 16, wherein determining whether to update causes said one or more computer executing said code to:
- determine risk, cost and urgency of said update;
- determine from risk and cost an operational cost and a cost of applying said update;
- determine whether said operational cost and a cost of applying indicate said update is complex, updates being typed as routine or targeted, updates identified as urgent or complex being identified as targeted updates;
- queue routine updates updating a respective image as a regularly scheduled VM image library update; and
- determine an optimal update time for each targeted update.

18. A computer program product for allocating shared system resources as in claim 17, wherein determining operational cost and cost of applying causes said one or more computer executing said code to:
- identify any image software (s) to be patched (p) from the patch history;
- generate a list of past incidents (In) associated with previously patching/updating software (s); and
- average listed said past incidents (In).

19. A computer program product for allocating shared system resources as in claim 17, wherein targeted updates are queued for updating at each said optimal update time, and determining said each optimal update time causes said one or more computer executing said code to:
- segment a maximum time (patchingDeadline) to patch into a plurality of time patch bins, each time patch bin being no longer than a selected patching period (patchingTimeSlotSize);
- heuristically pack said plurality of time patch bins with updates; and
- provide a list of packed bins, each packed bin indicating image updates to be applied in a specific time segment within patchingDeadline.

20. A computer program product for allocating shared system resources as in claim 19, wherein heuristically packing bins causes said one or more computer executing said code to maintain a moving average for each image of the number of requests for each VM image over a selected number of most recent patchingTimeSlotSize.

21. A computer program product for allocating shared system resources as in claim 16, wherein said shared system resources are cloud resources in a cloud environment and whenever provisioning said VM for said request is for provisioning from a VM image without any pending updates, after provisioning said VM, said one or more computer executing said code return to receiving requests without providing an alert.

22. A computer program product for allocating cloud resources, said computer program product comprising a computer usable medium having computer readable program code stored thereon, said computer readable program code comprising:
- computer readable program code means for receiving requests for cloud resources from client devices;
- computer readable program code means for storing a virtual machine (VM) image library with a plurality of VM images with bundled software for responding to received said requests, one or more of said images having an outstanding update, said outstanding update updating a part of a respective said VM image;
- computer readable program code means for provisioning VMs from said VM image library responsive to received client requests; and
- computer readable program code means for passing updated images to said computer readable program code means for provisioning and applying updates to respective ones of said images in said VM image library on a routine basis, and for
- determining whether said request are for VM images with any outstanding updates when a requests are received, and when one or more updates are outstanding selectively based on gathered data and history of logged past VM requests, updating images in said VM image library or providing updated individual VM images to said computer readable program code means for provisioning respective VMs and queuing said single instances for subsequently updating said individual VM images in said VM image library, and otherwise passing VM images from said VM image library.

23. A computer program product for allocating cloud resources as in claim 22, further comprising:

computer readable program code means for managing provisioned VM incidents;

computer readable program code means for an incident store storing information on past software patch and image update incidents from said computer readable program code means for managing incidents, responsive to each received client request said computer readable program code means for updating;

collects information about prior updates to each said respective VM image from said incident store, determines update costs of each said update to said each respective VM image, wherein update costs include operational cost and cost of applying a respective update, indicates each urgent update or said each update having said update costs determined above a selected threshold update as targeted, remaining updates being routine;

computer readable program code means for a targeted update repository, said updates indicated as targeted being queued in said targeted update repository with an update time to update said each respective VM image for optimal results; and computer readable program code means for a routine update repository, said updates indicated as routine being queued in said routine update repository and applied on said routine basis.

24. A computer program product for allocating cloud resources as in claim 23, further comprising:

computer readable program code means for a request history storage with logged prior requests for each VM image in said image library, said computer readable program code means for updating predicting VM image request frequency responsive to logged prior requests, and wherein said computer readable program code means for updating comprises:

computer readable program code means for listing incidents (In) on past software (s) patches (p), computer readable program code means for averaging listed incidents to determine said update costs, computer readable program code means for segmenting a maximum time (patchingDeadline) to patch into a plurality of time patch bins, each time patch bin being no longer than a selected patching period (patchingTimeSlotSize), computer readable program code means for heuristically packing said plurality of time patch bins with updates responsive to predicted said VM image request frequency, and computer readable program code means for providing a list of packed bins, each packed bin indicating image updates to be applied in a specific time segment within patchingDeadline.

* * * * *